May 19, 1970     C. P. SURPRISE     3,512,900
PNEUMATIC SEQUENCE CONTROLLER
Filed Oct. 23, 1967
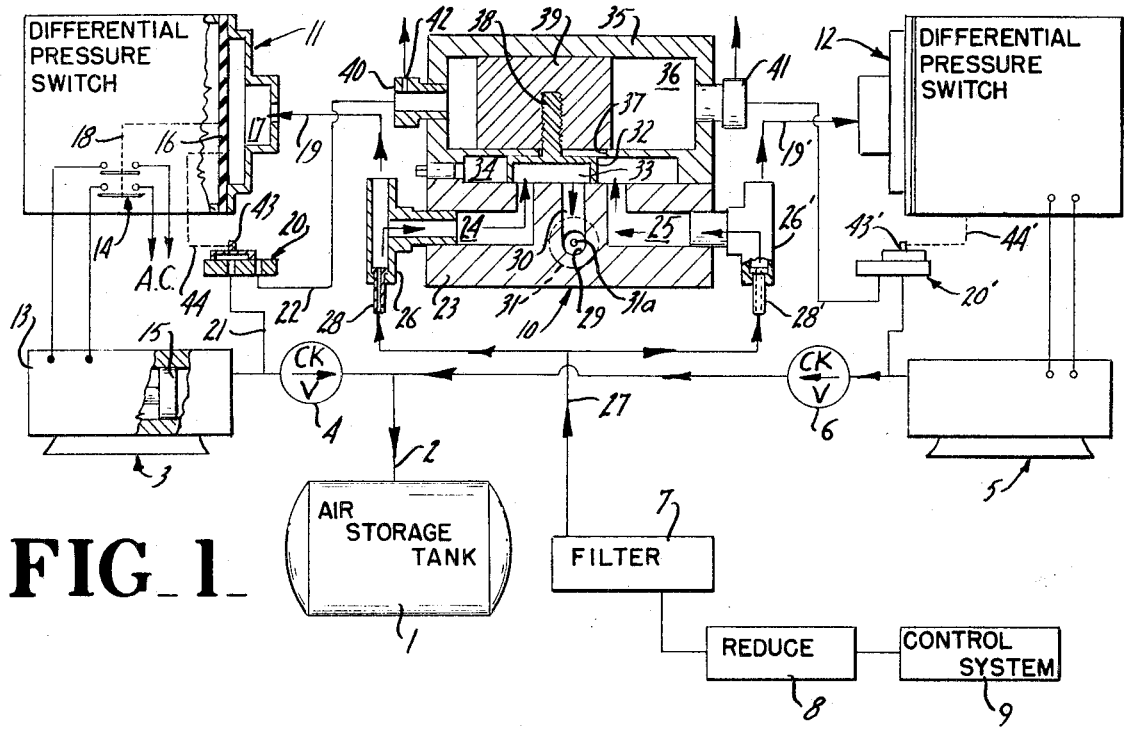
FIG_1_
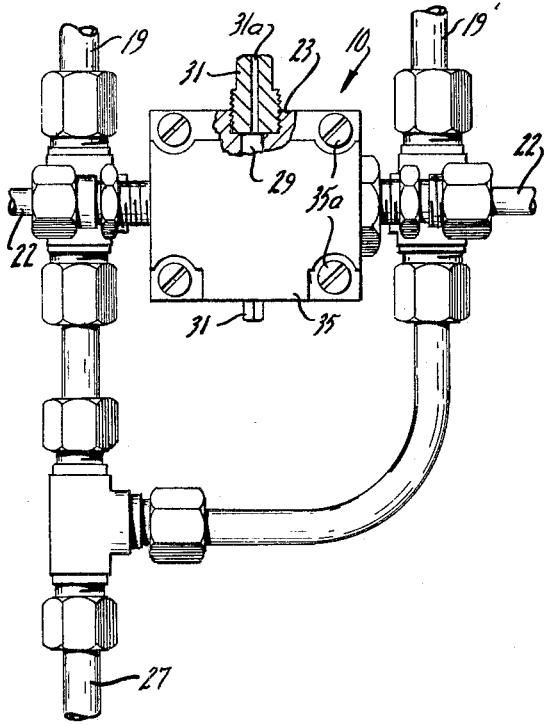
FIG_2_
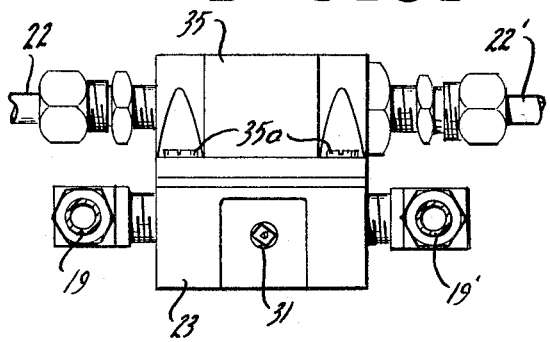
FIG_3_
INVENTOR
CHESTER P. SURPRISE
BY
*Andrus & Starke*
Attorneys

United States Patent Office 3,512,900
Patented May 19, 1970

3,512,900
PNEUMATIC SEQUENCE CONTROLLER
Chester P. Surprise, Wauwatosa, Wis., assignor to Johnson Service Company, Milwaukee, Wis., a corporation of Wisconsin
Filed Oct. 23, 1967, Ser. No. 677,129
Int. Cl. F04b 49/02
U.S. Cl. 417—6         15 Claims

ABSTRACT OF THE DISCLOSURE

A fluid responsive alternator alternately actuates a pair of motor driven compressors. A pair of pressure responsive differential switches is provided, one for each of the motors. The alternator includes a three way air valve having a pair of inputs each of which is connected to the storage means through a separate restrictor. Each input is also connected to a corresponding one of the differential pressure switches. The three way valve includes an output having a restrictor or the like and a valve member having a first position connecting the output to the one inlet and a second position connecting it to the second inlet. A piston freely slides in a cylinder having a pair of inputs, one to each side of the piston. Each compressor includes a normally closed unloader relief valve which unloads the compressor for starting against no load and is actuated by the pressure responsive switch for the corresponding compressor. The unloader relief valves are connected to exhaust the pressure to the alternator cylinder and thereby shift the piston and reverse the connection of the alternator output to the pair of inputs. The alternator establishes a differential in signals to the two pressure responsive switches such that the one switch is actuated before the other. The movement of the piston reverses the interconnection of the lines and differential signals between the two switches to provide alternate compressor operation.

---

This invention relates to a pneumatic sequence controller and particularly to such a controller for alternate actuation of a pair of compressors for providing compressed fluid to a storage means.

In pneumatic control systems and the like, air or other fluid may be stored within a suitable storage tank or the like under relatively high pressure and fed into the system through a pressure reducing means to provide a reduced operating pressure. As the pressure in the storage means drops, a compressor, or compressors, may be provided for recharging of the storage means to a selected maximum level. In this way the storage is always held between a minimum and maximum pressure substantially above the normal operating pressure of the system.

In connection with a typical installation for environmental control of temperature, pressure, humidity, flow and the like, it is common practice to maintain a storage tank as 70 to 90 p.s.i.g. (pounds per square inch gauge) for the control system requiring air at 16 or 20 p.s.i.g. The actual usage of the air will vary depending upon the conditions being controlled. The compressor will have a substantial excess capacity because of certain economics and extended life with such an arrangement. The compressor is controlled by pressure actuated means responsive to the tank pressure to operate the compressor only when the storage pressure drops below the 70 p.s.i.g. and cuts out when it increases to the maximum 90 p.s.i. The compressor may be driven by an electrical motor which is actuated intermittently in accordance with the requirement. Alternatively, the compressor may run continuously and be loaded and unloaded. Compressed air is supplied to the storage means only while it is loaded.

In certain applications, a pair of compressors will be provided and preferably connected to operate alternately. Such systems may include a sequence controller or alternator responsive to the operation of the compressors and in particular actuated by each compressor upon its de-energization or moving to standby to condition or set the opposite compressor for operation upon the next demand. Generally, all such alternators have heretofore been of an electrically controlled variety. An electrical sensing and switching system is interconnected to the electrical system of the compressors for alternate actuation of the compressors. Although such alternators can provide reliable and long life controls, they have certain distinct disadvantages particularly from the standpoint of pneumatic control manufacturers. The electrical nature of the present systems requires that the installation and maintenance be by people skilled in electrical control systems. Normally the personnel is not directly under the control and supervision of the control system contractor with a loss or reduction in control and accurate cost predictability. The above electrical switching and sensing devices also require redundant controls of substantially the same rating capacity. Consequently, the cost of the control system is substantially increased.

The present invention is particularly directed to a pneumatic sequence controller or alternator eliminating special electrical devices heretofore employed and permitting a penumatic control system which may be under complete control of the pneumatic systems manufacturer or contractor. Further, the pneumatic system of this system may employ part of the usual primary control system and provide a relatively inexpensive control while maintaining highly reliable and long life operation.

Generally, in accordance with the present invention, a fluid responsive controller is provided to control a pair of differential pressure responsive control means for a pair of compressors or the like and in particular to modify the pressure signal from the storage means to the pressure responsive control means in such a manner that a relative difference in pressure is applied to the two differential means such that the one means is effective in response to a decreasing signal from the storage means to actuate the related compressor and further response to the operation of such related compressor to condition the alternate pressure responsive means for controlling the alternate compressor during the next demand cycle. The pressure responsive means will thus alternately be actuated to control the related compressors and thus provide the desired alternate actuation of the compressors.

In connection with a particularly novel construction, the controller alternator includes a pressure responsive control valve means connected to the output of the storage means to establish a pair of differential control signal lines connected to the two pressure responsive control means such that the one pressure responsive means receives an operative signal before the opposite pressure responsive means. The pressure responsive control valve means further includes a reversing means to effectively reverse the interconnection of the lines and therefore reverse the pressure differential signal between the two pressure responsive control means. The reversing means has a pair of inputs, one of which is connected to a source of pressure through a valve actuated by the one pressure responsive control means, and the second of which is similarly connected by a valve actuated by the second pressure responsive control means. The reversing means functions such that as the pressure decreases in the storage means the compressor which remained off during the previous demand cycle will turn on before the previously identified on compressor, increase the supply to the storage means and actuate the reversing means, and thereby provide the desired alternate operation. This alternate actuation of the pressure responsive alternator valve means continues to provide the desired sequential operation.

More particularly, the alternator valve means may take the form of a three way air valve having a pair of inputs each of which is connected to the storage means through a restrictor. Each input is also connected to a corresponding one of the pressure responsive control means. The three way valve includes an output having a restrictor or the like and a valve member having a first position connecting the output to the one input and a second position connecting it to the second input. The alternator includes a piston slidably disposed within a piston chamber and having a connection to the valve member to correspondingly position the valve member in accordance with the location of the piston within the cylinder. The opposite ends of the cylinder are connected respectively by a normally closed unloader relief valve to the compressor and particularly which is interconnected to unload the compressor and to remove air trapped between the head and check valve to permit the motor or the compressor to start against no load. The normally closed unloader relief valve is connected to be actuated by the pressure responsive control means for the corresponding compressor. When the pressure responsive means turns off the associated compressor, the unloader relief valve is opened to exhaust the pressure and thereby provide a pressure pulse to the alternator which shifts the piston and thereby the valve member to change the connection of the restricted output to the opposite input thereby reversing the interconnection from the storage means to the three way valve.

The inlet connected to the outlet establishes a small restrictive flow passage through the outlet resulting in a pressure drop across the restrictor which is reflected in a reduced signal supplied to the corresponding pressure responsive control means. As the pressure of the storage means drops, the pressure responsive means connected to the inlet which is also connected to the outlet of the three way valve first responds and the associated compressor starts and increases the pressure of the storage means to the selected maximum level. The pressure responsive means is then actuated to stop the associated compressor and opens the release valve to exhaust the trapped air. The latter provides a pressure pulse signal to the alternator to reverse the valved connection.

The present invention thus provides a pneumatic sequencer constructed of a relatively simple and inexpensive control valve while maintaining reliable and long life sequence control.

The drawing furnished herewith illustrates a preferred construction of the present invention in which the above advantages and features are clearly disclosed as well as others which will be clear from the present description thereof.

In the drawing:

FIG. 1 is a schematic illustration of a compression system employing an alternator constructed in accordance with the present invention;

FIG. 2 is an elevational view of the alternator unit shown in FIG. 1; and

FIG. 3 is a top view of FIG. 2.

Referring to the drawing and particularly to FIG. 1, the present invention is described in connection with an air supply which may be employed in a pneumatic control. The illustrated air supply system includes an air storage tank 1 having a common inlet 2 interconnected to a first compressor 3 in series with a check valve 4 and to a second compressor 5 in series with a check valve 6. The check valves 4 and 6 prevent feedback of the stored air into the associated compressors through the common inlet 2 and the interchange of air between the compressors. An air filter 7 is connected to the output side of the storage tank. A reducing valve 8 is connected to the output of the air filter 7 to provide a suitable regulated air pressure for a control system 9. For example, an environmental control may have the storage tank 1 held at a minimum of 70 p.s.i.g. and at a maximum of 90 p.s.i. with the reducing valve 8 providing an output pressure of some regulated selected pressure between 15 and 20 p.s.i.g.

The control system may be for environmental control or any device consuming air and is therefore shown in block diagram. In accordance with the present invention, the filtered output of the storage tank 1 is also connected to an alternator control valve 10, which particularly forms the illustrated subject matter of the present invention, and to a pair of differential pressure actuator switch units 11 and 12 to provide an alternate operation of the compressors 3 and 5.

In the illustrated embodiment of the invention, the compressors 3 and 5 are similarly constructed and interconnected into the control system through the control valve 10. Consequently, the system for compressor 3 is decribed in detail with corresponding elements of the system for compressor 5 identified by primed numbers.

Compressor 3 is shown as a motor-driven reciprocating compressor having a single phase motor 13 interconnected to a suitable power supply by the contacts 14 of the differential pressure responsive switch unit 11. The motor 13 is coupled to actuate a piston 15 for compressing and transmitting air to tank 1 through the one way check valve 4. The switch 11 may be any desired construction and is diagrammatically shown as a diaphragm actuated unit which includes an operating diaphragm 16 defining a pressure control chamber 17 and interconnected to open and close contacts 14 through a suitable snap action actuator, such as a spring loaded, toggle over center assembly or other desired coupling, shown diagrammatically by the dashed coupling lines 18. The pressure chamber 17 is connected by an operating signal line 19 to the output of the storage tank 1 and to the control valve 10 as hereinafter described to provide the desired alternate actuation of compressor 3 with compressor 5.

The pressure responsive switch unit 11 is also connected to actuate a normally closed unloader relief valve 20, the one side of which is connected by a line 21 between the head of the compressor 3 and the check valve 4 to relieve high pressure air trapped between the head and the check valve when the compressor 3 stops. The opposite side of the relief valve 20 in the illustrated embodiment of the invention is connected by an alternator control signal line 22 to the control valve 10. The trapped air constitutes a pressurized fluid source to actuate the control valve 10 in response to the operation of compressor 3 and particularly the opening of the relief valve 20, and conditions the pressure responsive switch 12 for the second compressor 5 for operation during the next demand cycle.

Referring particularly to FIGS. 1–3, the illustrated control valve 10 is a three way valve having a rectangular valve body 23 having input ports 24 and 25 to the opposite ends thereof for similar interconnection to the tank 1 and pressure responsive switch units 11 and 12 respectively. The connection to unit 11 is therefore specially described. A T-connector 26 has the stem connected to port 24 and the opposite ends of the cross arm connected to line 19 and to a common line 27. An inline restrictor 28 is inserted in the input side of the connector 26 which is connected to the common line. The input passageways or ports 24 and 25 are similarly L-shaped and extend inwardly from the opposite ends and then outwardly to an outer surface of the valve body 23. A L-shaped outlet passageway or port 29 extends through the valve body 23 at right angles to the main portion of the inlet ports 24 and 25 and includes a connecting portion 30 which extends parallel to the offset portions of ports 24 and 25 to the same outer surface. A restrictor plug 31 is threaded into the outer end of the outlet passageway 29 and includes a restricted passageway 31a.

A valve member 32 is slidably mounted on the outer surface of the body 23 and includes a cavity or passageway 33 abutting the outer wall. The length of the passageway 33 generally corresponds to the distance from the outlet port portion 30 to the inlet ports 24 or 25. By positioning of the valve member 32 to one side or the other, the outlet passageway or port 29 is connected to either the input port 24 or the input port 25.

The inlet port not connected to the output port by the valve passageway 33 is connected to a closed chamber 34 defined by a recess within a piston housing 35 which is secured as by bolts 35a to the valve body 23. The housing 35 includes a piston cylinder 36 and a slot 37 through which a stem 38 of the valve member 33 projects. The stem 38 is threaded or otherwise rigidly secured to a piston 39 which is slidably disposed within the housing cylinder 36. The opposite ends of the cylinders 36 are provided with similar connectors 40 and 41 connected respectively to the appropriate signal lines 22 and 22' from the normally closed unloader relief valves 20 and 20' of the pressure responsive switch units 11 and 12. Each of the connectors 40 and 41 includes a small bleed restrictor opening 42 and 42' to permit exhaust of the air trapped in the compressor, as previously noted. The openings 42 and 42' in connectors 40 and 41 permit only the slow exit of the trapped air and therefore provide for the establishing of an operating pressure pulse between the adjacent wall of the cylinder 36 and the piston 39 upon the initial openings of the related valve 20 and 20' for moving of the piston 39.

The relief valves 20 and 20' are diagrammatically shown as sliding valve structures similar to those of valve 10 for simplicity of explanation and include a sliding valve member 43 coupled in any suitable manner to the diaphragm 16 as shown by dashed line 44 to selectively connect the line 21 to line 22.

The operation of the illustrated embodiment of the invention is summarized as follows.

Assume the pressure in the tank 1 is above the minimal level of 70 p.s.i.g. and the alternator valve 10 is disposed in the illustrated position of FIG. 1, i.e. with the piston 39 moved to the left side of the assembly such that the valve member 32 connects the inlet port 24 with the outlet port 29. The air pressure in the tank 1 is applied from the common line 27 to the control valve 10 and to the pressure responsive switch units 11 and 12. The pressure applied to the pressure responsive unit 11 however is less as a result of the flow through the line restrictor 28, control valve inlet port 24, valve member passageway 33, outlet ports 30 and 29, and restricted passageway 31a in the plug 31. The flows through the inline restrictor 28 result in a small pressure drop which is reflected in the line to pressure responsive switch unit 11. Consequently, when the tank pressure approaches the minimum desired pressure, there is an apparent greater drop reflected at the first pressure responsive switch unit 11. Consequently, the diaphragm 16 moves to close the contacts 14 for energization of the compressor 3. The operation of the compressor 3 immediately results in the transfer of additional air to the storage tank 1 with an increasing pressure in tank 1 to maintain this established condition. The increased pressure is applied to the two pressure responsive switch units 11 and 12. During the increase in pressure condition of course the same pressure differential will be maintained in lines 19 and 19' and therefore at the pressure responsive switch units 11 and 12. When the pressure of tank 1 reaches the selected maximum pressure level, the diaphragm 16 of unit 11 moves to open contacts 14 with a snap action thereby de-energizing the first compressor 3. Simultaneously, the normally closed unloader relief valve 20 is opened. This connects the pulse signal line 22 to the compressor line 21 which is connected to exhaust the air trapped between the head of the compressor 3 and check valve 4 and transmits a pressure pulse through the connector 40 to the cylinder 36 between the left end of the piston 39 and the adjacent end of the cylinder. This transfers the piston 39 to the opposite side of the cylinder 36 and moves the valve member 32 to now connect the outlet ports 29 and 30 to the opposite inlet port 25. The pressure condition established in the cylinder 36 to move the piston 39 is dissipated through the exhaust or bleed opening 42 in the connector 40.

As the pressure in the storage tank 1 decreases, the differential signal is agian established in signal lines 19 and 19' to the two pressure responsive switch units 11 and 12. However, with the piston 39 in the alternate position, the inlet port 25 associated with the pressure responsive switch unit 12 is connected for flow through the valve 10 and thereby establishes a pressure drop in the associated restrictor 28'. Consequently, the pressure responsive switch unit 12 is the first to be actuated upon the next demand.

The system will continue to operate in the above manner with the units 11 and 12, and consequently the corresponding compressors 3 and 5, alternately set or conditioned for operation by the valve 10. If for any reason the pressure responsive switch unit 11 or 12 associated with the normally closed port of the control valve 10 is actuated, due to an abnormal peak load demand or the like, any unloader pulse from it tends to establish the same condition previously established and therefore will not affect the programming in any way.

The present invention has been shown in connection with intermittently driven compressors but is equally applicable to other forms of controls such as the loading and unloading of continuously driven compressors.

It has been found that the present invention provides a relatively inexpensive and simple pneumatic control system for providing highly practical control of high reliability and long life.

I claim:

1. In a fluid compressor control system for storing of fluid under pressure within a storage means and a pair of fluid compressing means connected to supply fluid under pressure to said storage means and having pressure responsive means connected to said compressing means and to said storage means for actuating the compressing means, the improvement in a control means for actuating said pressure responsive means comprising pressure control means connected to said pressure responsive means to operably actuate one of said compressing means in response to a demand signal from said storage means and having fluid activated means actuated in response to the actuation of a compressing means to set the control means to actuate the other of said compressing means on the next demand signal and provide time spaced alternate operation of the fluid responsive means.

2. The system of claim 1 wherein said pressure responsive means includes a pair of pressure responsive means, one for each of said compressing means and said pressure control means includes a first position to establish a lesser pressure in said first pressure responsive means than in said second pressure responsive means for the same pressure in the storage means and having a second position establishing a lesser pressure in said second pressure responsive means than in said first pressure responsive means for the same pressure in the storage means, said fluid activated means being connected to establish said positions.

3. The system of claim 1 wherein each of said compressing means includes an electric drive motor and said pressure responsive means includes a first and a second pressure actuated differential control switch connected one each with one of the motors, and said pressure control means includes a first and second pressure varying means actuated by said fluid activated means, and said first pressure varying means connected to the first differential control switch and said second pressure varying means connected to the second differential control switch.

4. The system of claim 1 wherein said pressure control means includes a pair of valved passageways each having an inlet portion connected to a common line for connection to said storage means and each having a restrictor in the inlet portion, means connecting the downstream side of the restrictors to the pressure responsive means, and reversing means to alternately open said valved passageways to establish differential pressure signals to said pressure responsive means.

5. The system of claim 1 wherein said pressure control means includes a pair of inlet connectors each of which includes an inlet port including a restrictor and a pair of output ports, a valve body having a pair of inlet passageways connected one each to one of each of said inlet ports of said connectors and having an output passageway, a valve member having a first position connecting the outlet passageway to a first of said inlet passageways and a second position connecting the outlet passageway to the second of said inlet passageways, and said pressure responsive means having a first pressure responsive means coupled to the valve member to establish said first position and a second pressure responsive means coupled to the valve member to establish said second position, said first and second pressure responsive means having individual output means adapted to be connected respectively to a pair of compressors to actuate them to supply fluid under pressure to the storage means.

6. The system of claim 1 wherein said pressure control means includes a pair of inlet connectors each of which includes an inlet port including a restrictor and a pair of output ports, a valve body having a pair of L-shaped inlet passageways extended inwardly from opposite sides of the body and terminating in a common outer wall, the one inlet passageway being connected to one of said outlet ports of one of said connectors and the second inlet passageway being connected to one of the outlet ports of the second of said connectors, said valve body having an L-shaped output passageway extended between said inlet passageways with the stem portion terminating in said common outer wall, a sliding valve member on said common outer wall and having a first position connecting the outlet passageway to a first of said inlet passageways and a second position connecting the outlet passageways to the second of said inlet passageways, a piston disposed within a cylinder and connected to said valve member, said pressure responsive means having a pair of pressure responsive differential actuators connected one each to control one of said fluid compressing means and each having an input means, one of said input means being connected to the second outlet port of the one connector and the other of said input means being connected to the second outlet port of the other connector, and means actuated by said actuators and connecting a first and a second input means of the cylinder to the opposite ends of said piston to said first and second compressing means to position said piston between said positions.

7. The fluid compressor control system of claim 6 wherein each of the compressing means includes a compression chamber and unloader valve means actuated by the corresponding switch to unload the compression chamber in response to opening of the related switch, and connector means to connect the output side of said one unloader valve means to the first input means to said cylinder and the output side of the second unloader valve to the second input means to said cylinder.

8. The fluid compressor control system of claim 7 wherein said last named means includes vent means to slowly dissipate the fluid from said valve means.

9. The fluid compressor control system of claim 1 wherein said compressing means each includes an electric motor and said pressure responsive means includes a first pressure responsive differential switch connected to actuate a first compressing motor and a second pressure responsive differential switch connected to actuate a second compressing means, said differential switches each having a pressure control line connected to said storage means, a pair of flow restrictors one in each of said pressure control lines, and said pressure control means includes a valve means having a pair of flow passageways connected one each to said control lines and having said fluid activated means having a first position opening one flow path to operably insert the restrictor in the corresponding line to the first pressure responsive differential switch and having a second position opening the second flow passageway to operably insert the restrictor in the corresponding line to said second pressure responsive differential switch, said fluid activated means having a first and second input means connected to a pressurized fluid source to establish said positions and input means connected to said pressure responsive differential switches to selectively apply a fluid signal to the first and second input means in accordance with the actuation of said pressure responsive differential switches.

10. The fluid compressor control system of claim 9 wherein said fluid activated means includes a housing member having a movable member therein defining a pair of pressure chambers and said member connected to open and close said passageways, said first input means being connected to one chamber and the second input means beng connected to the second chamber, and said input means being connected to said switches to apply said fluid signal upon de-energization of the motors.

11. The fluid compressor control system of claim 10 wherein said reversing means includes a pulsed pressure actuated valve control member, a pressurized fluid source means, first means connected to said pressurized fluid source and to said valve control member and coupled to said first actuator to open the valved passageway connected to said second actuator, second means connected to said pressurized fluid source and to said valve control member and coupled to said second actuator to open the valved passageway connected to said first actuator.

12. The fluid compressor control system of claim 10 having a pair of inlet connectors, one for each of said input portions, each of said connectors including an inlet port including the corresponding restrictor and a pair of output ports, a valve body having a pair of inlet passageways forming a part of said valved passageways and connected one each to one of each of said outlet ports of said connectors and having a common output passageway, a valve member having a first position connecting the outlet passageway to a first of said inlet passageways and a second position connecting the outlet passageway to the second of said inlet passageways, and said reversing means is connected to said valve member.

13. The control valve of claim 12 wherein said pair of inlet passageways are L-shaped and extend inwardly from opposite sides of the valve body and terminate in a common outer wall, said valve body having a T-shaped output slidably extended between said inlet ports with the stem portion terminating in said common outer wall, said valve member is slidably mounted on said common outer wall and has a first position connecting the outlet passageway to a first of said inlet passageways and a second position connecting the outlet passageway to the second of said inlet passageways, a piston disposed within a cylinder and connected to said valve member, and said reversing means includes means for connecting the cylinder to the opposite ends of said piston to a pressure source means in response to operation of a pair of compressors to position said piston between said positions.

14. A fluid compressor control system for alternately operating a plurality of compressing means connected to supply fluid under pressure, comprising a first fluid pressure responsive means connected to a first compressing means and a second fluid pressure responsive means connected to a second compressing means, said pressure responsive means being connected to actuate the corresponding compressing means in response to successive similar fluid demand signals, and an alternator means having fluid control means connected to said fluid responsive means to operably actuate one of said fluid responsive means and a corresponding compressing means in response to a fluid demand signal and having fluid activated means, said fluid activated means having a first position to establish a lesser pressure in said first fluid pressure responsive means than in said second fluid pressure responsive means for the same pressure of the demand signal and having a second position establishing a lesser pressure in said second fluid pressure responsive means than in said first fluid pressure responsive means for the same pressure of the demand signal, said fluid activated means being actuated by said first and second fluid pressure responsive means to establish said positions in response to the actuation of the compressing means to reset the control means to alternately actuate the compressing means in response to succeeding demand signals.

15. The fluid compressor control system of claim 14 wherein each of said compressing means includes a separate drive controlled by the corresponding fluid pressure responsive means and a valve means actuated by the corresponding fluid pressure responsive means to unload the related compressing means by selected venting of the compressing chamber in the compressing means and establish starting of said compressing means in an unloaded state, and said fluid activated means includes an input means connected to said valve means and actuated by the venting of the compressing means.

References Cited

UNITED STATES PATENTS

| | | | |
|---|---|---|---|
| 950,737 | 1/1910 | Turner | 230—18 |
| 2,225,291 | 12/1940 | Alderson | 230—17 |
| 2,389,667 | 11/1945 | Hudson | 137—625.4 |
| 2,612,838 | 10/1952 | Nichols | 103—11 |
| 2,921,732 | 1/1960 | De Uin | 230—18 |
| 2,970,744 | 2/1961 | Hines | 230—18 |
| 2,974,682 | 3/1961 | Trask | 137—625.33 |
| 3,012,575 | 12/1961 | Woody et al. | 137—625.62 |
| 3,424,370 | 1/1969 | Law | 230—5 |

WILLIAM L. FREEH, Primary Examiner